United States Patent [19]

Mikalonis

[11] Patent Number: 5,113,322

[45] Date of Patent: May 12, 1992

[54] TRANSIT VEHICLE LIGHTING FIXTURE

[75] Inventor: Liudas K. Mikalonis, Northville, Mich.

[73] Assignee: Transmatic, Inc., Waterford, Mich.

[21] Appl. No.: 681,888

[22] Filed: Apr. 8, 1991

Related U.S. Application Data

[63] Continuation-in-part of Ser. No. 400,426, Aug. 30, 1989, Pat. No. 5,006,966.

[51] Int. Cl.⁵ .............................................. B60Q 3/02
[52] U.S. Cl. ........................................ 362/74; 362/75;
362/224; 362/225; 362/245; 362/330; 362/331;
362/332
[58] Field of Search ............... 362/61, 73, 74, 75,
362/224, 225, 245, 246, 329, 330, 332, 331, 340

[56] References Cited

U.S. PATENT DOCUMENTS

| | | | |
|---|---|---|---|
| 2,185,078 | 12/1939 | Hagerty et al. | 362/73 |
| 2,888,551 | 5/1959 | Nordquist | 362/73 X |
| 4,260,220 | 4/1981 | Whitehead | 350/96.28 |
| 4,387,415 | 6/1983 | Domas | 362/74 |
| 4,574,336 | 3/1986 | Mikalonis | 362/260 |
| 4,615,579 | 10/1986 | Whitehead | 350/96.1 |
| 5,006,966 | 4/1991 | Mikalonis | 362/74 |

Primary Examiner—Stephen F. Husar
Attorney, Agent, or Firm—Reising, Ethington, Barnard, Perry & Milton

[57] ABSTRACT

An elongated cornice lighting fixture in a public transit vehicle coupled with an advertising display panel is mounted above the windows on each side of the vehicle. Light from incandescent bulbs in each fixture is controlled by sheets of reflective optical film to direct the light to the seating area below each fixture and to a display panel with only minimal illumination of the vehicle floor and windows.

7 Claims, 3 Drawing Sheets

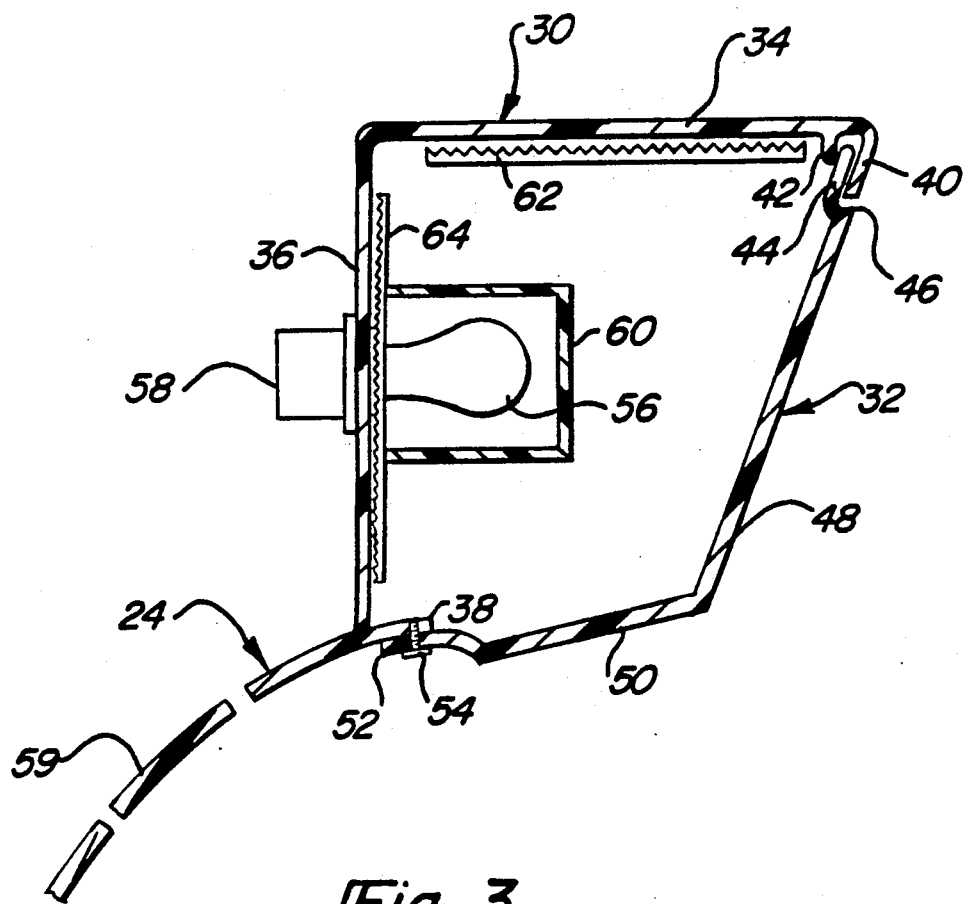
_Fig-3_
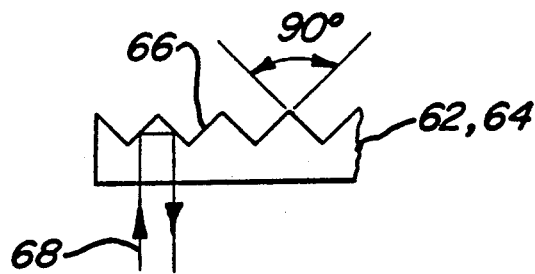
_Fig-4_

TRANSIT VEHICLE LIGHTING FIXTURE

This is a continuation-in-part of U.S. Ser. No. 400,426 filed Aug. 30, 1989 entitled "TRANSIT VEHICLE LIGHTING FIXTURE now U.S. Pat. No. 5,006,966 issued Apr. 9, 1991".

FIELD OF THE INVENTION

This invention relates to interior vehicle lighting and particularly to a lighting fixture arrangement for a public transit vehicle.

BACKGROUND OF THE INVENTION

My patent U.S. Pat. No. 4,574,336 and the patent to Domas U.S. Pat. No. 4,387,415 show cornice lighting fixtures that are used in public transit vehicles. They include an elongated display panel for holding advertising cards and an integral lamp housing made in long pieces for mounting longitudinally above the vehicle side windows and over the passenger seats. A translucent cover completes the housing and fluorescent tubes in the housing provide the light source. Inverter ballasts provide the necessary voltage and regulation for the fluorescent lamps. These devices are expensive to install and require maintenance. Thus it is desirable to replace the fluorescent lighting system.

This lighting arrangement supplies sufficient illumination to the region directly below the fixtures to meet governmentally mandated light levels in the seating area and also casts light across the aisle to illuminate the advertising cards on the opposite side of the vehicle. Incidental to this lighting pattern, the fixtures illuminate the aisle floor and side windows as well. The side window illumination is unnecessary and tends to hamper passenger night vision through the window. The lighting of the aisle floor is also unnecessary and tends to reflect onto the vehicle windshield. It is thus expected that both passenger and operator night vision can be enhanced by controlling the light from the fixtures into selected light patterns which significantly reduce the light level incident on the side windows and on the floor of the aisle.

A commercially available optical sheet material has been marketed for use with high intensity incandescent lamps as a substitute for fluorescent tubes. The material is explained in the patents to Whitehead, U.S. Pat. No. 4,260,220 and U.S. Pat. No. 4,615,579. The material is a transparent and reflective sheet and, when fashioned into a tube, serves as a hollow light guide to provide controlled illumination pattern from a lamp provided at its end. It is my proposal to use this material in a different configuration along with incandescent lamps in the lighting fixtures to provide the desired light patterns for a public transit vehicle.

SUMMARY OF THE INVENTION

It is therefore an object of the invention to provide a lighting fixture for a transit vehicle which avoids the use of fluorescent tubes and which provides directed light patterns for enhanced illumination.

The invention is carried out by using the aforementioned light fixtures modified to replace the fluorescent tubes with high intensity incandescent lamps in conjunction with optical elements to direct the light over a large area in the manner of a fluorescent tube but controlled to define a desired pattern of illumination.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a cross-sectional detail view of a lighting fixture according to the first embodiment of the invention;

FIG. 4 is a detail view of an optical film used in the fixture of FIG. 3;

DESCRIPTION OF THE INVENTION

A first embodiment of the invention will be described with reference to FIGS. 1, 2, 3 and 4.

Figure 1:
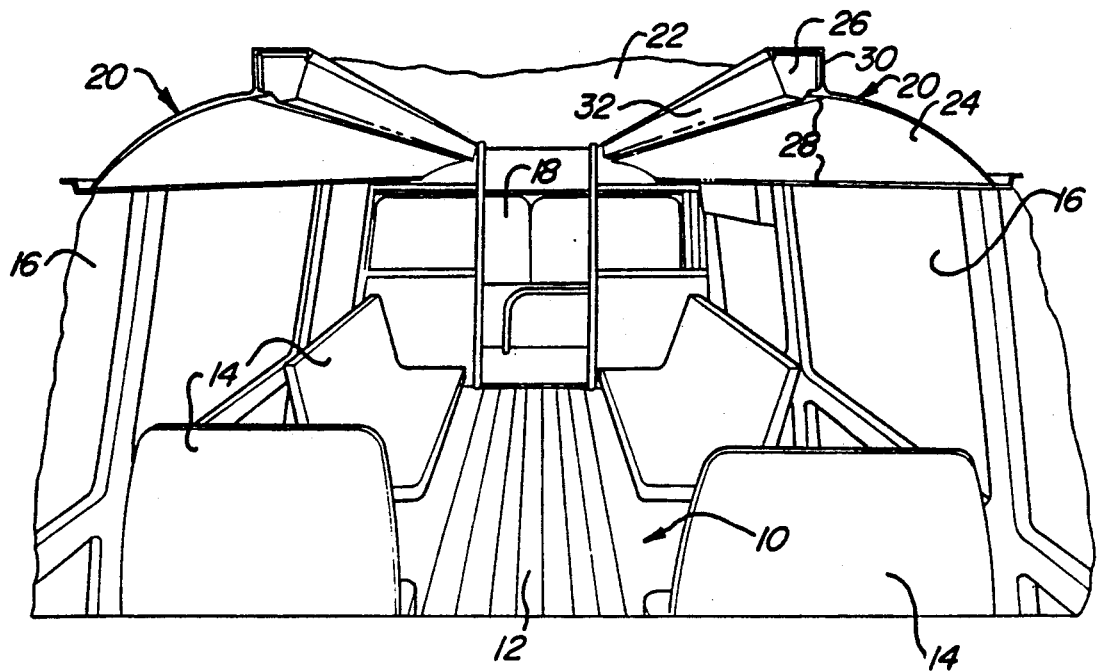
FIG. 1 is a perspective view of a vehicle interior having light fixtures according to the invention.

As shown in FIG. 1, the interior of a transit vehicle includes a floor 10 affording a center aisle 12 running longitudinally of the vehicle and supporting spaced sets of seats 14 bounded by side windows 16. Other windows comprise the front windshield 18. Combination display panels and light fixtures 20 are mounted above the side windows 16 and secured to the inside of the vehicle roof 22. The combination display panel and light fixture 20 includes a gently rounded display panel 24 positioned directly above the windows and a light fixture 26 located directly above the seats 14. The display area is bounded by upper and lower flanges 28 for holding advertising cards. The housing 30 of the light fixture and the display panel 24 are one piece formed preferably by pultrusion and are several feet long, even long enough to extend the length of the vehicle interior. Covers 32 over the light fixture housing 30 enclose lamps and are made of translucent material to transmit the light from the lamps. The cover material is formed of polycarbonate and may be either transparent or translucent white. Transparent material can have flutes or prisms to direct the light whereas white translucent material diffuses the light. With the exception of the fixture details described below, the fixture is described in the patent to Domas U.S. Pat. No. 4,387,415, which is incorporated herein by reference.

Figure 2:
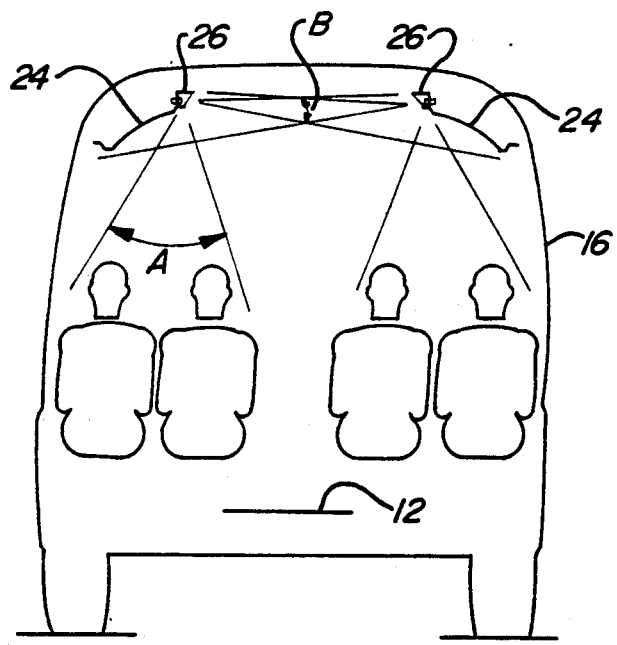
FIG. 2 is a cross-sectional view of a vehicle schematically showing the lighting pattern from the fixtures according to a first embodiment of the invention.

The fixture 26 is equipped with lamps and an optical arrangement to direct light to the seating area at required light levels which enable passengers to read while allowing only minor amounts of illumination of the aisle 12 and the side windows 16. As shown in FIG. 2 the light pattern is concentrated within angle A. This minimizes the light reflected onto the windshield 18 and also minimizes the interference with vision through the side windows. Each fixture also directs a second pattern of light through angle B to illuminate the display area 24 on the opposite side of the aisle. This pattern is concentrated on the display area and only minimal illumination of the side windows occurs.

The fixture 26 and a portion of the contiguous display panel 24 are shown in cross-section in FIG. 3. The housing 30 has an upper horizontal portion 34 and a vertical side portion 36. The lower part of the side portion 36 joins with the display panel 24 and also has an inwardly turned flange 38. The upper portion 34 terminates n a face flange 40 and a hidden flange 42 that cooperatively define a groove for receiving an upper edge 44 of the cover 32. An ogee shape 46 extruded in the light cover 32 adjacent the upper edge thereof provides a flush condition of the cover with the face flange 40. The cover has an inclined front face 48 and a generally horizontal lower face 50 which terminates in a lip 52 which is attached to the flange 38 by screw fasteners 54.

A plurality of incandescent high intensity lamps 56 are spaced along the fixture and are mounted in sockets 58 which are attached to the rear of the side portion 36 of the housing and the lamp extends through an aperture in the side portion 36. A removable or hinged access panel 59 for each lamp is provided in the display panel 24 to facilitate servicing. A diffuser 60 secured to the side portion partially surrounds the lamp 56 to allow moderate lighting to the cover 32 in the immediate neighborhood of the lamp so that neither a dark spot on a bright spot will appear in the cover. An optical arrangement comprising sheets of optical film is used to direct the light from each lamp to the preferred lighting areas. The sheets of optical film 62 and 64 are applied to the inner surfaces of the upper portion 34 and the side portion 36 respectively, and extend longitudinally of the vehicle.

The optical film is available as 3M Scotch (TM) optical lighting film and is described in the patents to Whitehead, U.S. Pat. No. 4,260,220 and U.S. Pat. No. 4,615,579, which are incorporated herein by reference. The film is a transparent plastic such as optical grade acrylic or polycarbonate about 0.2 inch thick and having a smooth surface on one side and prism shaped grooves on the other side. As shown in section in FIG. 4, the grooves 66 define 90 degree prism angles and are suited to reflect a light ray 68 entering the film from the smooth side. The film redirects the reflected rays such that the emanating light pattern tends to be compressed rather than expanded like a conventional plane mirror would do. The reflection is possible only for rays 68 which are incident on the film at a shallow angle. The ray 68 shown in FIG. 4 is at a shallow angle to the film and thus does not lie in the plane of the paper. Specifically, light rays emanating from a source in a cone less than 27.6 degrees from an axis parallel to the film grooves are totally internally reflected by the film and thus are redirected to pass through the cover.

The optical film sheets 62, 64 are mounted with the grooves extending longitudinally of the vehicle. The optical reflecting film 62 on the upper surface of the housing 30 thus reflects light from the lamps 56 through the angle A toward the seats 14. If the diffuser 60 does not cover the area between the lamp and the adjacent film, the film portion nearest a lamp may be too close to lie within the cone of reflected light so that only the optical film further from the lamp would be effective to form the desired light pattern in angle A. The light from the diffuser 60 would tend to fill in to prevent a dark space and the directed light from other lamps will also fill in. In another arrangement, by forming the diffuser to intercept the light directed toward the film, some of the light will be diffused and redirected at a small angle to the region of the film 62 adjacent to the light so that it can be reflected into the angle A region to enhance the seat lighting. In the same way, the optical reflecting film 64 on the side surface of the housing 30 directs light from the lamps 56 into the angle B to illuminate the display panel 24 across the aisle.

The second embodiment of the invention will now be described with reference to FIGS. 5, 6 and 7. The light fixture 26' is similar to that of the first embodiment; however, it is designed to provide a somewhat different light pattern. As shown in FIG. 7, the first light pattern produced by the fixture 26' is concentrated within angle A' for illuminating the seating area. The second light pattern is projected within an angle B' from the fixture 26' to illuminate the display area 24' on the same side of the aisle as the fixture. It will be appreciated, as the description of the second embodiment proceeds, that different light patterns may be achieved with the light fixture 26'. This second embodiment, like the first embodiment, is especially well adapted to provide only minimal illumination on the side windows and on the aisle area.

Figure 5:
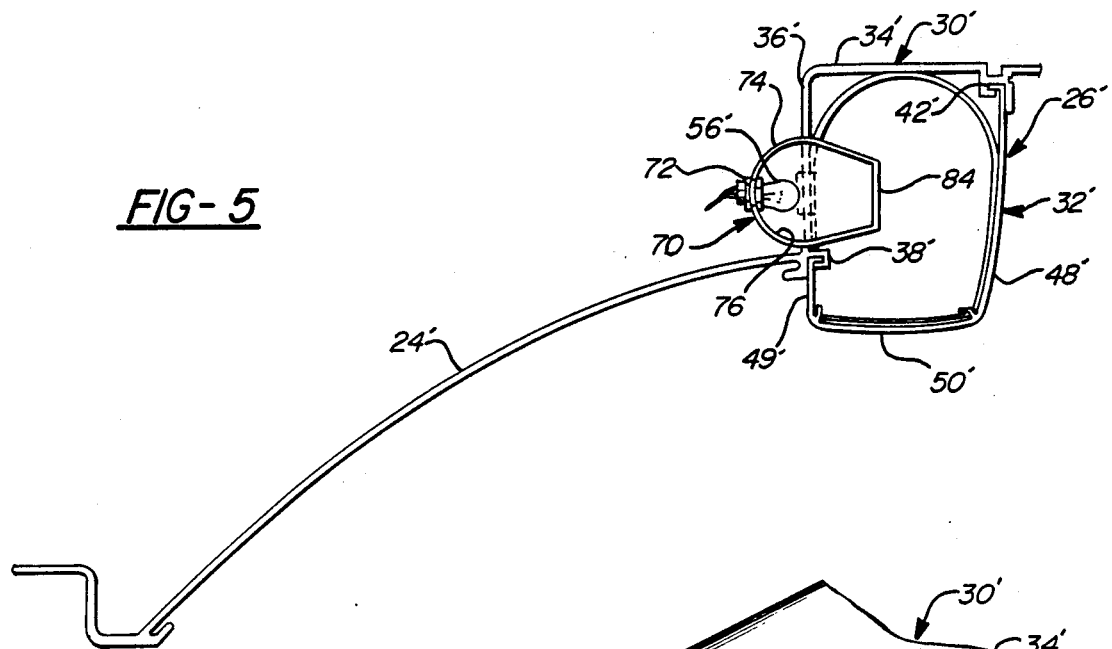
FIG. 5 is a cross-sectional view of a lighting fixture according to a second embodiment of the invention.
Figure 6:
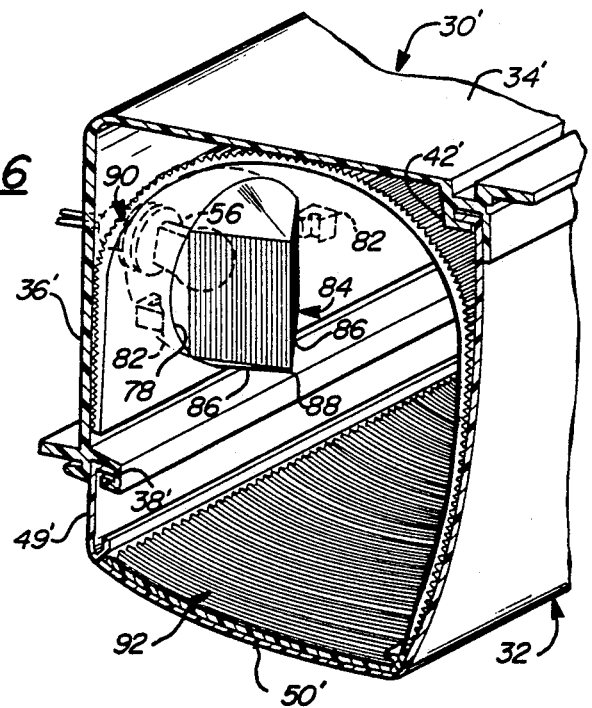
FIG. 6 is a perspective detail view of a fixture according to the second embodiment of the invention.
Figure 7:
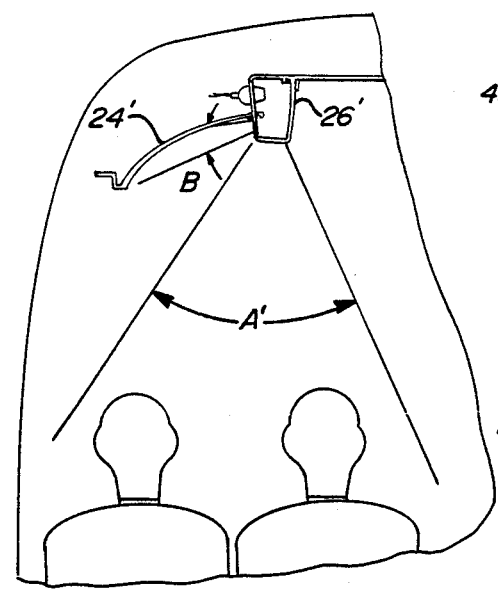
FIG. 7 schematically shows the lighting pattern from the fixture according to the second embodiment.

Details of the light fixture 26' and the contiguous display panel 24' are shown in FIGS. 5 and 6. The light fixture 26' including the housing 30' and the cover 32' is similar in construction to that of FIG. 3. The housing 30' has an upper horizontal wall or surface portion 34' and a vertical wall or surface portion 36'. The lower part of the side portion 36' joins with the display panel 24' and terminates in an inwardly-turned grooved flange 38'. The horizontal portion 34' terminates in a grooved flange 42'. The cover 32' has a side face or wall 48', a lower face or wall 50' and an additional side wall 49'. The upper edge of the side wall 49' terminates in an in-turned flange which is slidably insertable into the grooved flange 38'; similarly, the upper edge of the front wall 48' terminates in an in-turned flange which is slidably insertable into the grooved flange 42'.

A plurality of incandescent high intensity lamps 56' are spaced along the fixture 26'. Each lamp is mounted in a separate lamp compartment 70 which forms the part of the outer wall 36' of the housing 30'. Each lamp compartment 70 supports a lamp socket 72 and comprises a reflector body 74 which has an internal parabolic reflecting surface 76 around the lamp 56'. The lamp compartment 70 is a separate part from the wall surface 36' and is suitably constructed of molded plastic. The compartment 70 is removably mounted on the wall 36' and extends through a circular opening 78 therein. The compartment is mounted by a pair of resilient spring clips 82 unitary with the reflector body 74 and which pass through slots in the wall 36'. The compartment 70 further comprises a light directing member 84 which is suitably joined with the reflector body 74. The light directing member 84 comprises a unitary pair of transparent plates 86 which are joined at an apex 88 to form a tent-shape having a triangular horizontal cross-section. The light directing member 84 is provided on its outer surface with vertically extending flutes which redirect the light from the lamp 56' in a longitudinal direction of the housing 30'.

An optical arrangement comprising panels or sheets of optical film is used to direct the light from the lamps and the light directing members 84 to the preferred lighting areas. The first panel 90 of optical film is formed as a channel extending longitudinally of the housing 30'. The panel 90 is made of the same film as films 62 and 64 described with reference to FIGS. 3 and 4. This optical film, as aforesaid, is available as 3M Scotch (TM) Optical Lighting Film from the 3M Corporation. It is known as "SOLF" (Scotch Optical Lighting Film). It is sufficiently self sustaining that it will retain the channel-shape of panel 90 by reason of the confinement by the walls of the housing 30' and cover 32'. The panel 90 is provided with openings to allow the light directing member 84 to be disposed inside the channel of the panel 90. A second optical film in the form of a substantially flat sheet or panel 92 is disposed on the inner surface of the lower wall 50'. This optical film, also available from 3M Corporation, is known as "TRAF" (Transmissive Right Angle Film). This film, like that described above, has prism-shaped grooves on one surface and is smooth on the other surface. The panel 92 is disposed with the grooves toward the light source and extending transversely of the housing 30'. This film has the property of redirecting light rays which are directed longitudinally of the housing 30', i.e. parallel to the film and transversely of the grooves, so that the rays emanate from the smooth surface of the film in a direction normal thereto. The panel 92 may be extended, if desired, to cover the side wall 49' of the cover 32' or a separate piece like panel 92 may be disposed over the inner surface of wall 49' with the grooves extending transversely of the housing 30'; alternatively, the wall 49' may be left uncovered as shown.

Light from the incandescent lamp 56' of each lamp compartment 70 is projected by the parabolic reflector 76 to the rear surface of the light directing member 84. The light rays emanate from the member 84 in a longitudinal direction of the housing 30' and the channel formed by the panel 90. The light rays, emitted from the member 84 as a source, are incident on the panel 90 at a shallow angle. Thus, the rays are internally reflected by the film of the panel and are redirected inwardly from the panel 90. Thus, the panel 90 serves to contain the light and very little passes therethrough. Accordingly, the wall 48' of the cover is not appreciably illuminated. The light which is contained and reflected by the panel 90 is transmitted by the panel 92 through the lower wall 50' of the cover to form the desired light pattern with a high level of illumination in the pattern A'. In a similar manner, light is transmitted through the side wall 49' to form the desired light pattern in the angle B'. The plurality of spaced lamps 56' in the lamp compartments 70 are effective, by reason of the light directing members 84 and the light film panels 90 and 92, to provide a substantially uniform distribution of light level in the light patterns of angles A' and B'.

It will thus be seen that by modifying the production light fixtures for public transit vehicles by incorporating incandescent lamps and commercially available optical film, the fluorescent tubes and associated inverter ballasts can be eliminated and at the same time, improved control of the lighting is obtained to enhance driver and passenger vision.

Although the description of this invention has been given with reference to particular embodiments, it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. In a public transit vehicle having side windows, an aisle extending along the longitudinal axis of the vehicle and a passenger seating area on either side of the aisle, a lighting fixture arrangement for preferentially illuminating the seating area and minimizing the illumination of the aisle and side windows, comprising:

a lighting fixture above a passenger seating area,
   said fixture having an elongated light housing extending generally parallel to the aisle, the housing comprising an upper surface, an adjacent side surface, and a translucent cover having a first side wall spaced from the said side surface and a bottom wall spaced from the upper surface to define a cavity,
   a plurality of spaced incandescent lamps for producing spaced light sources within the housing, and
   first optical means positioned in the housing adjacent each light source to receive light from the adjacent light source for preferentially directing light from the light sources through the bottom wall of the translucent cover to the seating area, said first optical means adjacent each light source comprising a reflective panel of transparent material having grooves extending longitudinally of the light housing on the side opposite the incident light from the light sources for reflecting the light in a controlled pattern,
   said panel being formed as a channel extending longitudinally of the light housing and opening toward said bottom wall, whereby the seating area is illuminated at a higher level than the aisle and side windows.

2. The invention as defined in claim 1 wherein,
   said fixture has within its housing second optical means adjacent each light source,
   said second optical means comprising a light transmissive panel having grooves extending transversely of the light housing on the side adjacent the incident light from the light sources,
   said light transmissive panel being disposed on said bottom wall for transmitting light from said reflective panel to said seating area.

3. The invention as defined in claim 1 wherein an elongated display area is disposed above the windows adjacent said fixture and wherein,
   said cover has a second side wall spaced from the first side wall below said side surface, whereby light is transmitted from said reflective panel through said second side wall onto said display.

4. The invention as defined in claim 1 wherein,
   said housing includes a plurality of spaced lamp compartments disposed in said side surface with one of said lamps in each compartment,
   each of said compartments including third optical means for emitting light from the lamp therein into said channel longitudinally of said housing.

5. The invention as defined in claim 4 wherein,
   said third optical means is located inside said channel, and said compartment includes a reflector body located outside said channel for projecting light to said third optical means.

6. The invention as defined in claim 5 wherein,
   said reflector body includes a socket for a lamp and is removably mounted in said side surface.

7. The invention as defined in claim 4 wherein,
   said third optical means comprises a pair of transparent plates disposed in said channel at opposite oblique angles to the longitudinal direction of said housing with flutes thereon for redirecting light from the lamp longitudinally of said housing.

* * * * *